United States Patent [19]
Fitzke

[11] 3,876,818
[45] Apr. 8, 1975

[54] ELECTRIC ARC FURNACE WALL INCLUDING WATER COOLED BEZEL RING

[75] Inventor: William O. Fitzke, Canton, Ohio

[73] Assignee: Republic Steel Corporation, Cleveland, Ohio

[22] Filed: Aug. 13, 1973

[21] Appl. No.: 387,630

[52] U.S. Cl............................. 13/32; 266/39
[51] Int. Cl............................. F27b 14/08
[58] Field of Search ............. 13/9, 32, 35; 266/39

[56] References Cited
UNITED STATES PATENTS
2,414,545   1/1947   Moore ............................ 13/32
3,756,172   9/1973   Brereton ......................... 13/35

Primary Examiner—Roy N. Envall, Jr.
Attorney, Agent, or Firm—Watts, Hoffmann, Fisher & Heinke

[57] ABSTRACT

A segmented water-cooled bezel ring is positioned atop the shell of an electric arc furnace to support the furnace roof. The bezel ring segments are arcuate along their length and are positioned in abutting end-to-end relationship around the top of the furnace shell. Non-restrictive connections formed among the segments and the shell permit independent thermal expansion and contraction movement of the segments without developing and accumulating such stresses as will cause warping or cracking failure of the bezel ring. Each bezel ring segment has a self-contained coolant chamber of sufficient size to promote mixing of entering coolant water with coolant water already present to promote uniform coolant temperature throughout the chamber.

13 Claims, 7 Drawing Figures

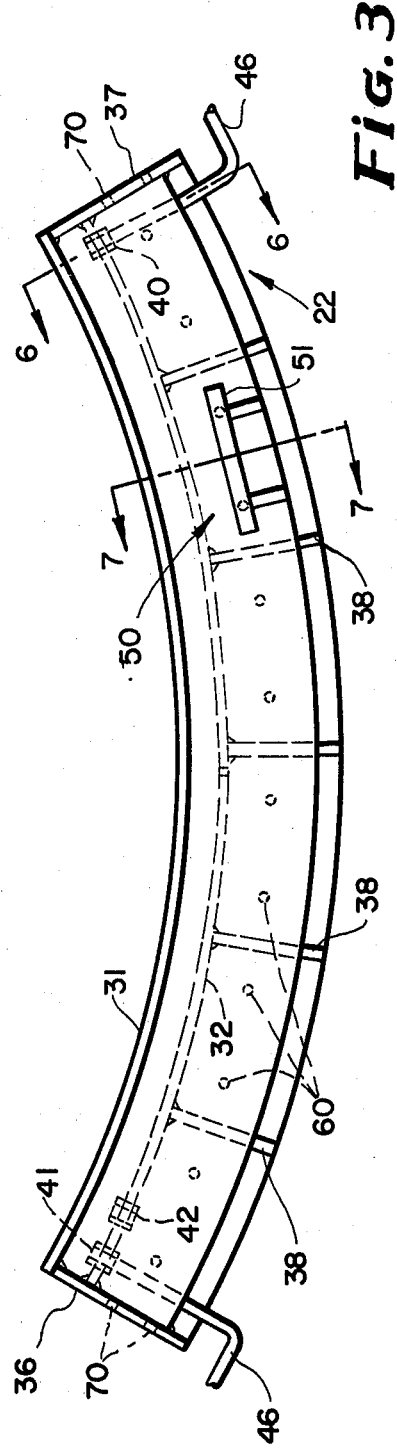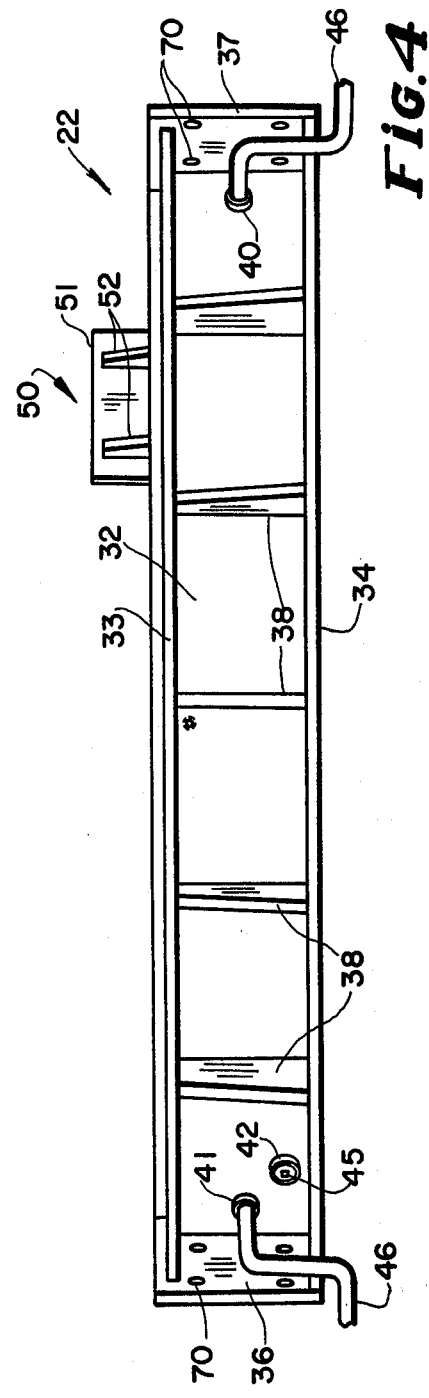

_3,876,818_

ELECTRIC ARC FURNACE WALL INCLUDING WATER COOLED BEZEL RING

BACKGROUND OF THE INVENTION

1. Field of the Invention

The present invention relates generally to electric arc furnaces and more particularly to a novel and improved wall structure for electric arc furnaces.

2. Prior Art

Electric arc furnaces are constructed in the form of large refractory-lined containers of circular cross-section. The container is tiltable about a horizontal axis in order to pour its molten contents through an aperture in its sidewall. The open top of the container is covered by a removable furnace roof. Heat is supplied to the furnace by electrodes which depend vertically through the roof into the center of the container.

Three electrodes are ordinarily used, and three-phase alternating voltage is applied to the electrodes. Current flows from the electrodes through the material being heated in the furnace, resulting in arcs which give off intense radiant heat. This radiation, together with the hot gases circulating in the furnace, heats not only the charge of material in the furnace but also the furnace walls and roof.

Lower portions of the furnace wall are referred to as the furnace shell. The shell has a reinforced steel outer structure lined with refractory material. A bezel ring extends above the shell and supports the roof structure.

Known electric arc furnace bezel rings are formed as an integral part of either the shell or the roof structure. Rigid buckstays transmit stresses through the bezel ring and between the bezel ring and the shell. Stress concentrations develop during repeated temperature reversals cause cracking and warping of the bezel ring and its consequent failure after relatively short periods of use. Substantial maintenance costs are occasioned when the furnace must be shut down to replace a bezel ring which has failed.

Proposals have been made to prolong bezel ring life by water cooling the ring to minimize the temperature differentials to which the ring is subjected. Known efforts to provide an operable water-cooled bezel ring have resulted in increased rather than lessened temperature differentials. Relatively high cooling water flow rates have typically been employed in conjunction with constant diameter cooling pipes to transmit cooling water rapidly around the bezel ring. Bezel ring portions adjacent the cooling conduits tend to achieve an operating temperature which is substantially lower than portions which are further removed from the cooling conduits. The resulting non-uniform cooling adds to the thermal stresses, and the result has been to shorten rather than to prolong operating life.

In view of the difficulties encountered with water-cooled bezel ring proposals, many electric arc furnaces in present day use employ a dry, refractory filled bezel ring which is rigidly reinforced in an effort to maintain the concentricity of the ring and to prevent failure by warping and cracking. Such structures make practically no provisions for stress relief and they typically have relatively short operating lives.

SUMMARY OF THE INVENTION

The present invention overcomes the foregoing and other drawbacks of the prior art and provides a novel and improved electric arc furnace wall structure including a water-cooled bezel ring having a substantially improved operating life.

In accordance with one feature of the present invention, a segmented bezel ring is provided including a plurality of arcuate segments arranged in end-to-end relationship around the top of an electric arc furnace shell. The furnace shell is provided with a top plate defining a planar, upwardly facing top surface. The bezel ring segments rest on this top surface in a "free floating" manner which permits relative movement between the bezel ring segments and the shell during thermal expansion and contraction.

Each of the bezel ring segments carries a self-contained coolant chamber that extends substantially the full length of its respective segment. The coolant chambers each have a relatively large, uniform cross-section. Cooling water is admitted to and discharged from opposite end regions of the chambers through conduits which have a relatively small cross-sectional area in comparison with that of the chambers. By this arrangement cooling water entering one of the chambers is caused to mix with the reservoir of water already in the chamber, with the result that the cooling chamber water is much more uniform in temperature throughout the chamber. This uniformity of coolant temperature minimizes local thermal stress concentrations and serves to prolong the operating life of the bezel ring segments.

Each of the bezel ring segments includes a top plate, a bottom plate, an inner wall plate, an outer wall plate, and a pair of end plates. The inner and outer wall plates are arcuate along their lengths and extend in spaced side-by-side relationship to define opposite sides of the coolant chamber. The top and bottom plates are welded to the inner and outer wall plates and cooperate therewith to define the top and bottom walls of the coolant chamber. The end plates cap opposite ends of the segment and define the ends of the coolant chamber. Threaded apertures formed in opposite end regions of the outer wall plate provide ports of entry and discharge for cooling water.

In accordance with another feature of the invention, the bezel ring segments are coupled one to another and to the furnace shell in such fashion as will permit the independent thermal expansion and contraction of the segments. The bottom plate of each segment extends outwardly substantially beyond the region of the cooling chamber to provide a mounting flange which rests on the top plate of the furnace shell. Aligned bolt holes are formed through the bottom plate and the shell top plate at spaced intervals along the length of the segment. Bolts having a diameter which is less than that of these bolt holes are used to secure the segments atop the shell. The play between the bolts and the bolt holes permits the segments to "float" or move atop the shell for such incremental distances as are involved in thermal expansion and contraction.

In a similar manner, non-restrained end connections are formed between adjacent bezel ring segments. The end plates of the segments extend outwardly beyond the region of the cooling chambers and provide flanges for joining abutting segments one to another. Bolts positioned in aligned bolt holes through abutting end plates secure adjacent segments together.

The resulting furnace wall structure has been found in tests to have a very substantially improved operating life over known proposals employing both water-cooled and dry, refractory filled bezel rings. The improved bezel ring has been found to retain its concentricity without warping or cracking, thereby substantially reducing maintenance costs involved in electric arc furnace operation.

In view of the foregoing summary, it will be apparent that a general object of the present invention is to provide a novel and improved electric arc furnace wall construction including a water-cooled bezel ring having a substantially improve operating life.

Other objects and a fuller understanding of the invention may be had by referring to the following description and claims taken in conjunction with the accompanying drawings.

BRIEF DESCRIPTION OF THE DRAWINGS

FIG. 3 is a top plan view of one segment of the bezel ring;

FIG. 4 is a side elevational view of the bezel ring of FIG. 3;

DESCRIPTION OF THE PREFERRED EMBODIMENT

Figure 1:
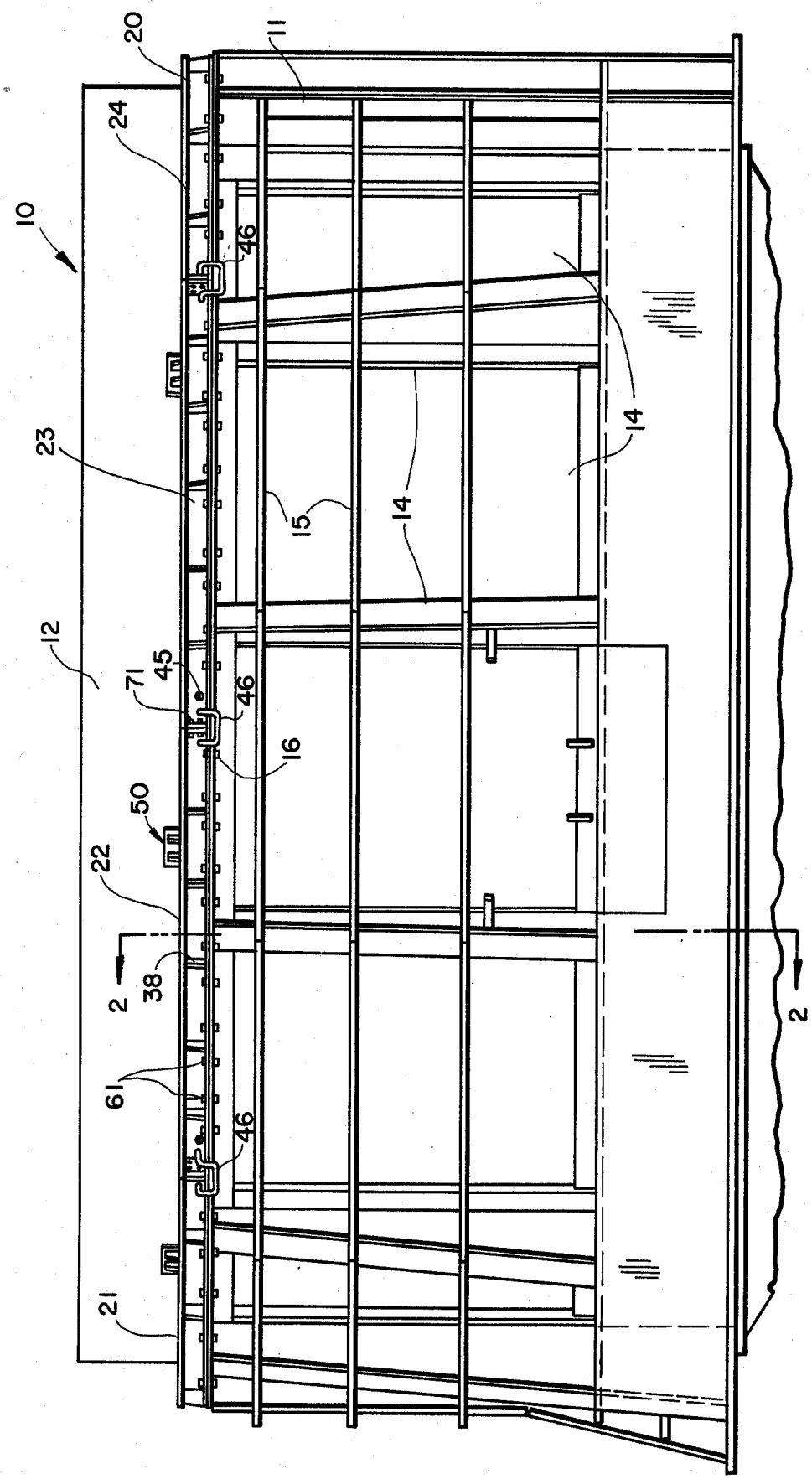
FIG. 1 is a side elevational view of an electric arc furnace shell with the bezel ring of the present invention atop the shell.

Referring to FIG. 1, an electric arc furnace is shown generally at 10. The furnace 10 includes a reinforced steel shell 11 which is lined with refractory material (not shown) to define a cylindrical, upwardly opening furnace chamber. A roof structure 12 extends over the furnace chamber opening. Electrodes (not shown) depend through the roof structure 12 and into the furnace chamber. A bezel ring 20 interposed between the shell 11 and the roof structure 12 removably mounts the roof structure 12 atop the shell 11.

The shell structure 11 includes a plurality of arcuate plates 13 which, in assembly, extend perimetrically around the furnace chamber. A plurality of axial and circumferential reinforcing members 14, 15 are welded to the plates 13 to strengthen and rigidify the shell 11. An annular top plate 16 provides a flat upwardly facing annular surface 17 on which the bezel ring 20 rests.

The bezel ring 20 includes six arcuate segments, four of which are shown in FIG. 1 at 21, 22, 23, 24. The segments are substantially identical one with another and are positioned in end-to-end relationship atop the surface 17.

Figure 2:
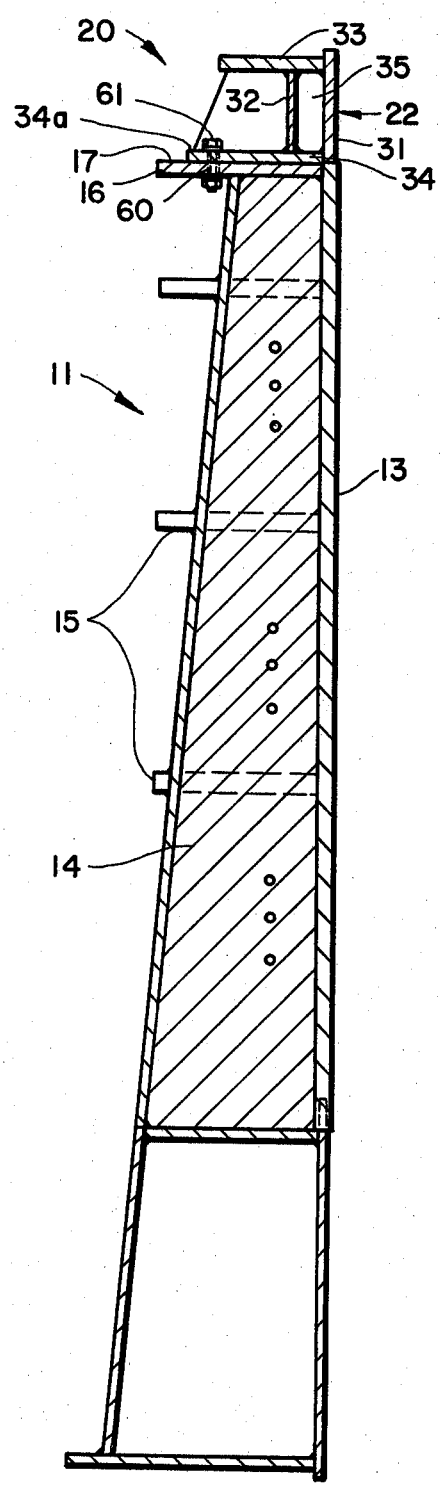
FIG. 2 is a cross-sectional view of the furnace shell and bezel ring of FIG. 1 as seen from the plane indicated schematically by the line 2—2 of FIG. 1.
Figure 5:
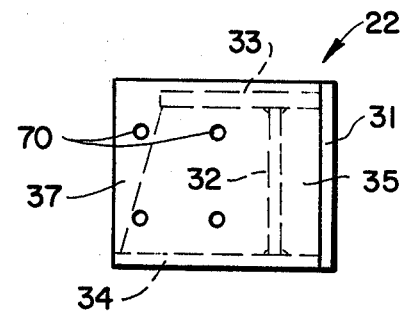
FIG. 5 is an end elevational view of the bezel ring segment of FIG. 3.

Referring to FIG. 2, the bezel ring segment 22 includes inner and outer wall plates 31, 32. As seen in FIG. 3, the inner and outer wall plates 31, 32 are arcuate along their length and extend in side-by-side uniformly spaced relationship. Top and bottom plates 33, 34 are welded to the inner and outer wall plates 31, 32 and cooperate therewith to define a coolant chamber 35. End plates 36, 37 welded to the inner, outer, upper and lower plates 31–34 cap opposite ends of the coolant chamber 35. A plurality of upright ribs 38 are interposed between and welded to the top and bottom plates 33, 34 to assist in transmitting the load of the roof structure 12 to the shell 11.

Figure 6:
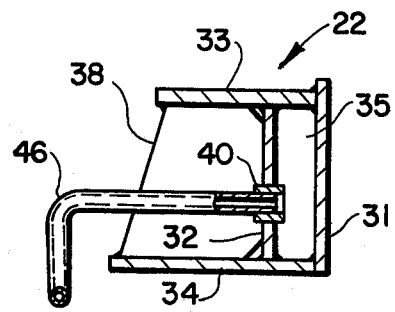
FIGS. 6 and 7 are cross-sectional views as seen from the planes indicated by the lines 6—6 and 7—7 respectively in FIG. 3.
Figure 7:
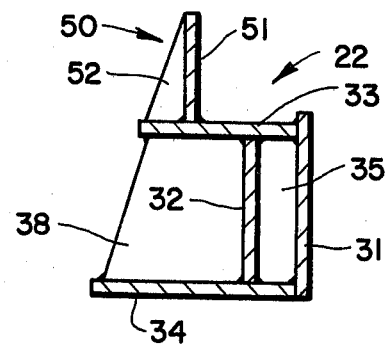

Entry, discharge and drain ports 40, 41, 42 are provided through the outer wall plate 32 for admitting and discharging cooling water to the chamber 35. As shown in FIG. 6, the cross-sectional area of these ports are relatively small in comparison with the cross-sectional area of the chamber 35. By this arrangement, cooling water admitted to the chamber 35 through the port 40 will not flow in a direct and rapid fashion to discharge through the port 41, but rather will mix with cooling fluid already in the chamber 35. This mixing action provides a uniform cooling fluid temperature which minimizes temperature differentials and resulting stresses.

The drain port 42 in each of the bezel ring segments is normally closed by a plug 45. The entry and discharge ports 40, 41 of the various segments can be interconnected by such conduits as 46 to transmit cooling water sequentially through several of the segment chambers 35 before it is discharged. Alternatively, the ports 40, 41 can be connected directly to water supply and drain pipes (not shown) such that the chambers 35 are all in parallel fluid communication with the water supply and drain pipes. Where adjacent segment chambers 35 are interconnected for series fluid flow, the interconnecting conduits 46 are provided with expansion loops which will not inhibit the independent thermal expansion and contraction of adjacent segments.

Roof retainer brackets 50 are provided atop each of the bezel ring segments to guide and retain the roof structure 12 in place atop the bezel ring 20. The brackets 50 include an upstanding plate 51 and a pair of reinforcing ribs welded to the top plate 33.

In accordance with one feature of the present invention, the bezel ring segments are secured to the shell top plate 16 in a manner which permits the bezel ring to "float" or move relative to the shell. As is best seen in FIG. 2, the bottom plate 34 extends radially outwardly a substantial distance beyond the region of the cooling chamber 35 to define a mounting flange 34a. Aligned bolt holes 60 are formed through the mounting flange 34a and the shell top plate 16 at circumferentially spaced positions along the mounting flange 34. Bolts 61 extend through the holes and secure the bezel ring segments to the shell 11.

The location of the bolt holes 60 at positions spaced substantially radially outwardly of the cooling chamber regions assures that the bolts 61 will not inhibit incremental torsional warping movements of bezel ring portions in the vicinity of the cooling chambers 35. The bolt holes 60 are of a size which is sufficiently larger than the diameter of the bolts 61 to permit incremental movements of the segments relative to the shell.

Non-restrained end connections between adjacent bezel ring segments likewise permit relative incremental segment movement. The end plates 36, 37 extend substantially radially outwardly of the cooling chamber regions to define connection flanges through which bolt holes 70 are formed to loosely receive bolts 71. The play between the bolts 71 and the larger diameter bolt holes 70 is sufficient to accommodate such incremental relative segment movement as may occur during thermal expansion and contraction.

The segmented nature of the bezel ring together with (1) the free floating connections between each segment and the shell, (2) the non-restrained end connections between the segments, and (3) the coolant mixing action which minimizes temperature differentials operate together in an synergistic manner to accommodate thermal expansion and contractions in the bezel ring without tending to develop and accumulate such stresses as will result in failure by warping or cracking.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. In an electric arc furnace of the type including an upstanding generally cylindrical shell, a roof structure, and a bezel ring interposed between the shell and the roof structure, the improvement wherein said shell has a planar top surface and said bezel ring comprises a plurality of generally arcuate segments positioned in end-to-end relationship atop said top surface, each of said segments having self-contained water cooling chamber means formed therein, and mounting means for individually connecting each of said segments to the shell and connecting adjacent segments to each other so that each segment can thermally expand and contract independently of the shell and of the other segments.

2. The electric arc furnace of claim 1 additionally including conduit means communicating with end regions of said cooling chambers to admit and discharge cooling water to and from said chambers, said chambers having a relatively uniform cross-sectional area along the length of their respective segments, which cross-sections are substantially larger than the cross-sectional areas of said conduit means, whereby cooling water admitted to said chambers through said conduit means is caused to mix with the cooling water already in the chambers to promote a relatively uniform cooling water temperature throughout each chamber.

3. The electric arc furnace of claim 2 wherein said conduit means connects selected ones of said chambers in series communication one with another whereby cooling water admitted to one of said selected chambers passes sequentially through the other selected chambers before being discharged, said conduit means being arranged to permit the relative incremental movement of adjacent bezel ring segments.

4. The electric arc furnace of claim 1 wherein each of said segments comprises:
 a. an arcuate inner wall plate extending continuously along the length of the segment;
 b. an arcuate outer wall plate extending continuously along the length of the segment in spaced side-by-side relationship with said inner wall plate;
 c. a top wall plate and a bottom wall plate extending continuously along the length of the segment in spaced overlying relationship and cooperating with said inner and outer wall plates to define said cooling chamber therebetween; and
 d. a pair of end plates capping opposite ends of said cooling chamber.

5. The electric arc furnace of claim 4 wherein said bottom plate extends outwardly of the region of said cooling chamber to define a mounting flange, and said mounting means includes shell connection means for securing said mounting flange to the shell while permitting incremental relative movement therebetween.

6. The electric arc furnace of claim 5 wherein said furnace shell includes a top shell plate defining said top surface, and said shell connection means includes fasteners extending through aligned apertures formed in said mounting flange and said top shell plate.

7. The electric arc furnace of claim 6 wherein said end plates extend outwardly of the region of said cooling chamber to define connection flanges, and said mounting means includes end connection means for securing adjacent connection flanges together while permitting incremental relative movement therebetween.

8. The electric arc furnace of claim 7 wherein said end connection means includes fasteners extending through aligned apertures formed in said adjacent end connection flanges.

9. An electric arc furnace wall structure, comprising:
 a. an upstanding generally cylindrical shell structure defining a top surface extending substantially continuously around the shell structure;
 b. a segmented bezel ring including a plurality of arcuate segments arranged in spaced end-to-end relationship on said top surface;
 c. each of said segments including an arcuate inner wall and wall means cooperating therewith to define a self-contained coolant chamber adjacent the outer side of said inner wall; and
 d. mounting means coupling said segments to said shell structure and coupling adjacent segments to each other while permitting incremental relative thermal expansion and contraction movement among said segments and said shell structure.

10. The electric arc furnace wall structure of claim 9 wherein said wall means includes wall portions on each segment which extend radially outwardly beyond the region of said coolant chambers and said mounting means includes fastener means operative to connect said wall portions to the shell and to corresponding wall portions on adjacent segments.

11. An electric arc furnace wall structure comprising:
 a. a reinforced steel shell defining an annular upwardly facing top wall;
 b. a segmented annular bezel ring positioned atop said top wall with the ends of adjacent segments in abutting end-to-end relationship one with another;
 c. connection means securing said adjacent segment ends together;
 d. mounting means connecting said segments to said shell;
 e. each of said segments including:
  i. an arcuate inner wall plate extending continuously along the length of the segment;
  ii. an arcuate outer wall plate extending continuously along the length of the segment in spaced side-by-side relationship with said inner wall plate;
  iii. a top wall plate and a bottom wall plate extending continuously along the length of the segment in spaced overlying relationship and cooperating with said inner and outer wall plates to define a coolant chamber;
  iv. a pair of end plates capping opposite ends of said coolant chamber;
 f. said connection means and said mounting means being operative to interconnect said segments and said shell in such fashion as will permit relative thermal expansion and contraction movement among the segments and the shell.

12. The electric arc furnace wall structure of claim 11 wherein said connection means and said mounting means are arranged to interconnect said segments and said shell at locations spaced radially outwardly from the region of said coolant chambers.

13. The electric arc furnace wall structure of claim 11 wherein entry and discharge ports are formed through said inner wall plate to admit and discharge coolant to and from said chamber, said ports each having a cross-sectional area which is substantially less than the cross-sectional area of said coolant chamber, whereby coolant entering said chamber is caused to mix with coolant already within said chamber to promote a relatively uniform coolant temperature throughout said chamber.

* * * * *